(12) United States Patent
Shoup et al.

(10) Patent No.: US 9,410,572 B2
(45) Date of Patent: Aug. 9, 2016

(54) FIVE-AXIAL GROOVE CYLINDRICAL JOURNAL BEARING WITH PRESSURE DAMS FOR BI-DIRECTIONAL ROTATION

(71) Applicant: Lufkin Industries, Inc., Lufkin, TX (US)

(72) Inventors: Thomas Patrick Shoup, Wellsville, NY (US); Jeffrey Lawrence, Lufkin, TX (US)

(73) Assignee: Lufkin Industries, LLC, Dallas, TX (US)

(\*) Notice: Subject to any disclaimer, the term of this patent is extended or adjusted under 35 U.S.C. 154(b) by 72 days.

(21) Appl. No.: 14/275,314

(22) Filed: May 12, 2014

(65) Prior Publication Data
US 2015/0323000 A1   Nov. 12, 2015

(51) Int. Cl.
| F16C 33/10 | (2006.01) |
| F16C 17/02 | (2006.01) |
| F16C 33/02 | (2006.01) |
| F16C 17/10 | (2006.01) |

(52) U.S. Cl.
CPC .............. *F16C 17/028* (2013.01); *F16C 33/02* (2013.01); *F16C 33/107* (2013.01); *F16C 33/1045* (2013.01); *F16C 33/1065* (2013.01); *F16C 17/02* (2013.01); *F16C 17/107* (2013.01); *F16C 2220/20* (2013.01); *Y10T 29/49641* (2015.01)

(58) Field of Classification Search
CPC ...... F16C 17/02; F16C 17/022; F16C 17/028; F16C 32/0614; F16C 32/0629; F16C 32/064; F16C 32/0659
See application file for complete search history.

(56) References Cited

U.S. PATENT DOCUMENTS

| 1,940,301 | A | | 12/1933 | Grobel et al. |
| 2,348,928 | A | | 5/1944 | Sampatacos |
| 2,507,021 | A | | 5/1950 | Lakey |
| 2,950,002 | A | | 8/1960 | Eastburg |
| 3,021,182 | A | | 2/1962 | Schnacke |
| 3,378,319 | A | | 4/1968 | Cutting et al. |
| 3,454,312 | A | | 7/1969 | Bielec |
| 3,502,375 | A | | 3/1970 | Whittum |
| 3,515,449 | A | | 6/1970 | Harbage |
| 3,687,510 | A | | 8/1972 | Cooper |
| 3,893,737 | A | | 7/1975 | Tyson |
| 3,941,434 | A | \* | 3/1976 | Schurger ............. F16C 32/0659 384/120 |

(Continued)

FOREIGN PATENT DOCUMENTS

| EP | 1334282 | 8/2003 |
| GB | 671769 | 5/1952 |
| JP | 56-76724 | 6/1981 |

OTHER PUBLICATIONS

Moro, V., International Search Report for International Application No. PCT/US2015/029894, European Patent Office, dated Sep. 10, 2015.

(Continued)

*Primary Examiner* — Thomas R. Hannon
(74) *Attorney, Agent, or Firm* — Sutton McAughan Deaver PLLC

(57) ABSTRACT

A five-axial groove cylindrical journal bearing assembly with pressure dams designed for bi-directional rotation for rotatably supporting a rotating body provided with a babbitted inner surface. The journal bearing assembly has two pressure dams that are substantially mirror images of each other along a centerline between the pressure dams and has two pressure dams each located substantially opposite the direction of two vector loads of the journal bearing assembly.

20 Claims, 6 Drawing Sheets

(56) References Cited

U.S. PATENT DOCUMENTS

| | | | |
|---|---|---|---|
| 3,982,796 A | 9/1976 | Hill | |
| 4,247,157 A | 1/1981 | Sigg | |
| 4,291,926 A | 9/1981 | Tomioka et al. | |
| 4,302,060 A | 11/1981 | Nicholas et al. | |
| 4,335,925 A | 6/1982 | Stopp | |
| 4,456,391 A | 6/1984 | New | |
| 4,474,483 A * | 10/1984 | Suzuki | F16C 32/064 384/100 |
| 4,497,587 A | 2/1985 | Pine | |
| 4,501,505 A | 2/1985 | Chambers | |
| 4,566,204 A | 1/1986 | Friesner | |
| 4,699,524 A | 10/1987 | Bath | |
| 5,211,484 A | 5/1993 | Quaglia | |
| 5,288,153 A | 2/1994 | Gardner | |
| 5,423,613 A | 6/1995 | Keck et al. | |
| 5,433,528 A * | 7/1995 | San Andres | F16C 32/0689 384/100 |
| 5,480,234 A * | 1/1996 | Chen | F16C 17/02 384/118 |
| 5,482,380 A | 1/1996 | Corratti et al. | |
| 5,513,917 A | 5/1996 | Ide et al. | |
| 5,515,458 A | 5/1996 | Ide et al. | |
| 5,518,321 A | 5/1996 | Hata | |
| 5,547,287 A | 8/1996 | Zeidan | |
| 5,660,481 A | 8/1997 | Ide et al. | |
| 5,702,186 A | 12/1997 | Hackstie et al. | |
| 5,738,447 A | 4/1998 | Nicholas | |
| 5,743,654 A | 4/1998 | Ide et al. | |
| 5,879,085 A | 3/1999 | Ball et al. | |
| 5,915,843 A | 6/1999 | Mattera | |
| 5,951,172 A | 9/1999 | Byrne | |
| 6,485,182 B2 | 11/2002 | Nicholas | |
| 2002/0081044 A1 | 6/2002 | Shima | |
| 2008/0056632 A1 | 3/2008 | Yoshimura et al. | |
| 2014/0161381 A1 | 6/2014 | Buchanan et al. | |
| 2014/0254963 A1 * | 9/2014 | Blair | F16C 17/028 384/115 |
| 2014/0270607 A1 | 9/2014 | Livermore-Hardy et al. | |

OTHER PUBLICATIONS

Moro, V., Written Opinion for International Application No. PCT/US2015/029894, European Patent Office, dated Sep. 10, 2015.

Nicholas, J.C., "Stabilizing Turbomachinery with Pressure Dam Bearings", Encyclopedia of Fluid Mechanics, vol. 2, Gulf Publishing Company, Dec. 1994.

Nicholas, J., "Bearing Solutions for High-Speed Gearbox Applications", Gear Solutions, Jul. 2011.

Mehta, N.P. et al., "Stability of Finite Elliptical Pressure Dam Bearings with Rotor Flexibility Effects", ASLE Transactions, vol. 29, No. 4, pp. 548-557, Apr. 1981.

Nicholas, J.C. et al., "Analysis of Step Journal Bearings—Finite Length, Stability", ASLE Transactions, vol. 22, No. 2, pp. 197-207, Apr. 1980.

Nicholas, J.C., "Stability, Load Capacity, Stiffness, and Damping Advantages of the Double Pocket Journal Bearing", ASME Journal of Tribology, Jan. 1985.

Nicholas, J.C. et al., "Theory and Application of Multipocket Bearings for Optimum Turborotor Stability", ASLE Transactions, vol. 24, No. 2, pp. 269-275, Apr. 1981.

Timken, "AP Bearings for Industrial Applications", Timken catalog, copyright 2008 by Timken, [retrieved from the internet on Oct. 22, 2014 using <URL: http://www.timken.com/EN-US/products/Documents/Timken-AP-Bearing-Catalog.pdf>].

Vesselinov, V., International Search Report for International Application No. PCT/US2015/044699, European Patent Office, dated Dec. 10, 2015.

Vesselinov, V., Written Opinion for International Application No. PCT/US2015/044699, European Patent Office, dated Dec. 10, 2015.

* cited by examiner

FIVE-AXIAL GROOVE CYLINDRICAL JOURNAL BEARING WITH PRESSURE DAMS FOR BI-DIRECTIONAL ROTATION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to journal bearings; and more specifically related to a five-axial groove cylindrical journal bearing with pressure dams for bi-directional gearbox rotation while maintaining dynamic stability.

2. Description of the Related Art

U.S. Pat. No. 5,660,481 to Ide discloses a hydrodynamic journal bearing which may be mounted within a sealed housing assembly. If mounted for rotation with the shaft, the bearing pads move relative to a smooth support surface. The bearing pad may be formed to contact the shaft in the installed state and to deflect under fluid film pressure.

U.S. Pat. No. 5,513,917 to Ide and Zeidan discloses a one-piece hydrodynamic bearing, which can include hydrostatic support features. The bearings may have hydrostatic and active control attribute.

The inventions disclosed and taught herein are directed to a hydrodynamic five-axial groove cylindrical journal bearing with pressure dams for bi-directional gearbox rotation while maintaining dynamic stability and the method of manufacturer thereof.

BRIEF SUMMARY OF THE INVENTION

The objects described above and other advantages and features of the invention are incorporated in the application as set forth herein, and the associated drawings, related to a five-axial groove cylindrical journal bearing with pressure dams for bi-directional gearbox rotation while maintaining dynamic stability.

In accordance with a first embodiment of the present disclosure, a cylindrical hydrodynamic journal bearing assembly is disclosed. The cylindrical hydrodynamic journal bearing assembly typically includes an inner surface, a first pressure dam and a second pressure dam machined into the inner surface. The first pressure dam and the second pressure dam are typically substantially mirror images of each other along a centerline between the first pressure dam and the second pressure dam. The cylindrical hydrodynamic journal bearing assembly typically includes a plurality of axial grooves machined in the inner surface to form a plurality of fixed bearing pads. The axial grooves typically can be substantially symmetrically positioned on the inner surface. The first pressure dam can be located substantially opposite the direction of a first vector load of the journal bearing assembly. The first pressure dam and the second pressure dam can be shallow circumferential rectangular reliefs of uniform depth. The plurality of axial grooves may be rectangular reliefs of non-uniform depth. the plurality of axial groves comprises a first axial groove, a second axial groove, a third axial groove, a fourth axial groove and a fifth axial groove. The second pressure dam may be located substantially opposite the direction of a second vector load of the journal bearing assembly. The plurality of fixed bearing pads may comprise a first fixed bearing pad, a second fixed bearing pad, a third fixed bearing pad, a fourth fixed bearing pad, and a fifth fixed bearing pad. The journal bearing assembly may comprise two halves. The inner surface may include a babbitted surface.

In accordance with another embodiment of the present disclosure, a method of manufacturing a hydrodynamic journal bearing assembly is disclosed. The hydrodynamic journal bearing assembly typically includes an inner surface. The method of manufacturing a hydrodynamic journal bearing assembly typically includes machining a first pressure dam and a second pressure dam on the inner surface and machining a plurality of axial grooves machined on the inner surface to form a plurality of fixed bearing pads. The first pressure dam and the second pressure dam typically are substantially mirror images of each other along a centerline between the first pressure dam and the second pressure dam. The axial grooves typically can be substantially symmetrically positioned on the inner surface. The first pressure dam can be located substantially opposite the direction of a first vector load of the journal bearing assembly. The second pressure dam can be located substantially opposite the direction of a second vector load of the journal bearing assembly. The first pressure dam and the second pressure dam can be shallow circumferential rectangular reliefs of uniform depth. The journal bearing assembly can comprise two halves.

In accordance with yet another embodiment of the present disclosure, a hydrodynamic journal bearing assembly is disclosed. The hydrodynamic journal bearing assembly typically includes a first pressure dam and a second pressure dam machined into the inner surface and a plurality of axial grooves machined in the inner surface to form a plurality of fixed bearing pads. The first pressure dam typically is located substantially opposite the direction of a first vector load of the journal bearing assembly. The second pressure dam typically is located substantially opposite the direction of a second vector load of the journal bearing assembly. The axial grooves are typically substantially symmetrically positioned on the inner surface. The first pressure dam and the second pressure dam can be substantially mirror images of each other along a centerline between the first pressure dam and the second pressure dam. The first pressure dam and the second pressure dam can be shallow circumferential rectangular reliefs of uniform depth. The plurality of axial grooves can be rectangular reliefs of non-uniform depth. The plurality of groves can comprise a first axial groove, a second axial groove, a third axial groove, a fourth axial groove and a fifth axial groove. The plurality of fixed bearing pads can comprise a first fixed bearing pad, a second fixed bearing pad, a third fixed bearing pad, a fourth fixed bearing pad, and a fifth fixed bearing pad. The journal bearing assembly can comprise two halves. The inner surface can include a babbitted surface.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
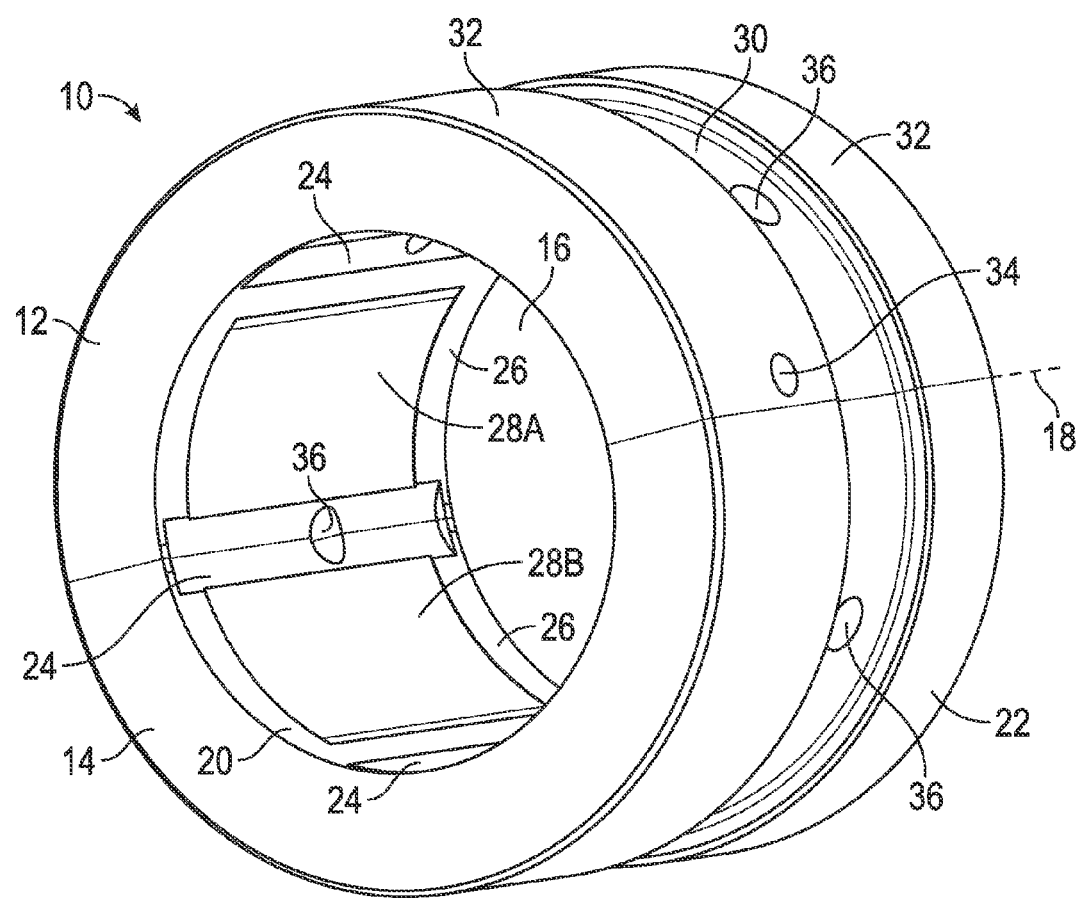
FIG. 1 illustrates a perspective view of one of many possible embodiments of journal bearing assembly utilizing the present inventions.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a hydrodynamic five-axial groove cylindrical journal bearing with pressure dams for bi-directional gearbox rotation while maintaining dynamic stability.

Figure 2:
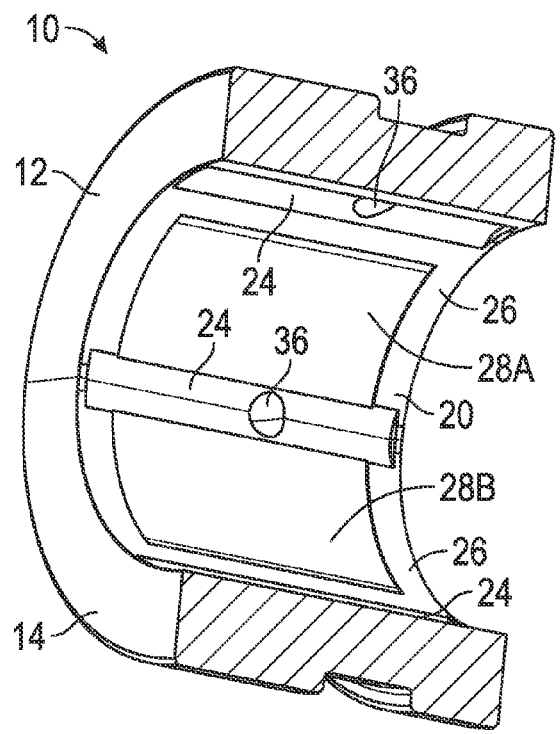
FIG. 2 illustrates another perspective view of a segment of the embodiment illustrated in FIG. 1.
Figure 3:
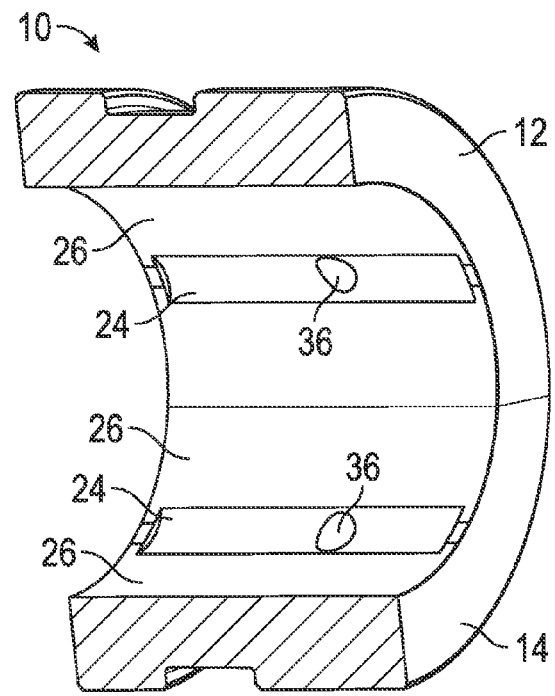
FIG. 3 illustrates another perspective view of a segment of the embodiment illustrated in FIG. 1.
Figure 4:
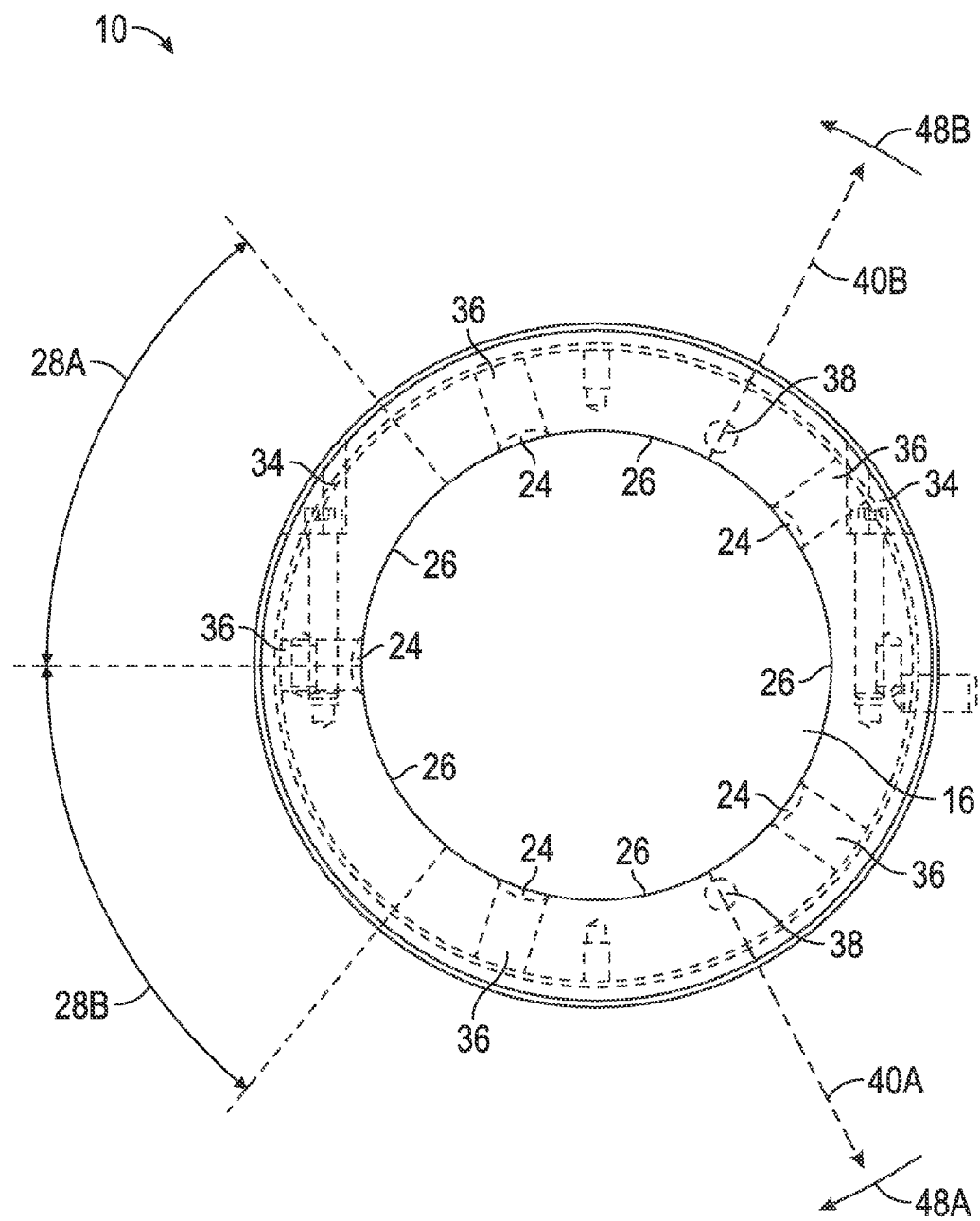
FIG. 4 illustrates a sectional view of the embodiment illustrated in FIG. 1.
Figure 5:
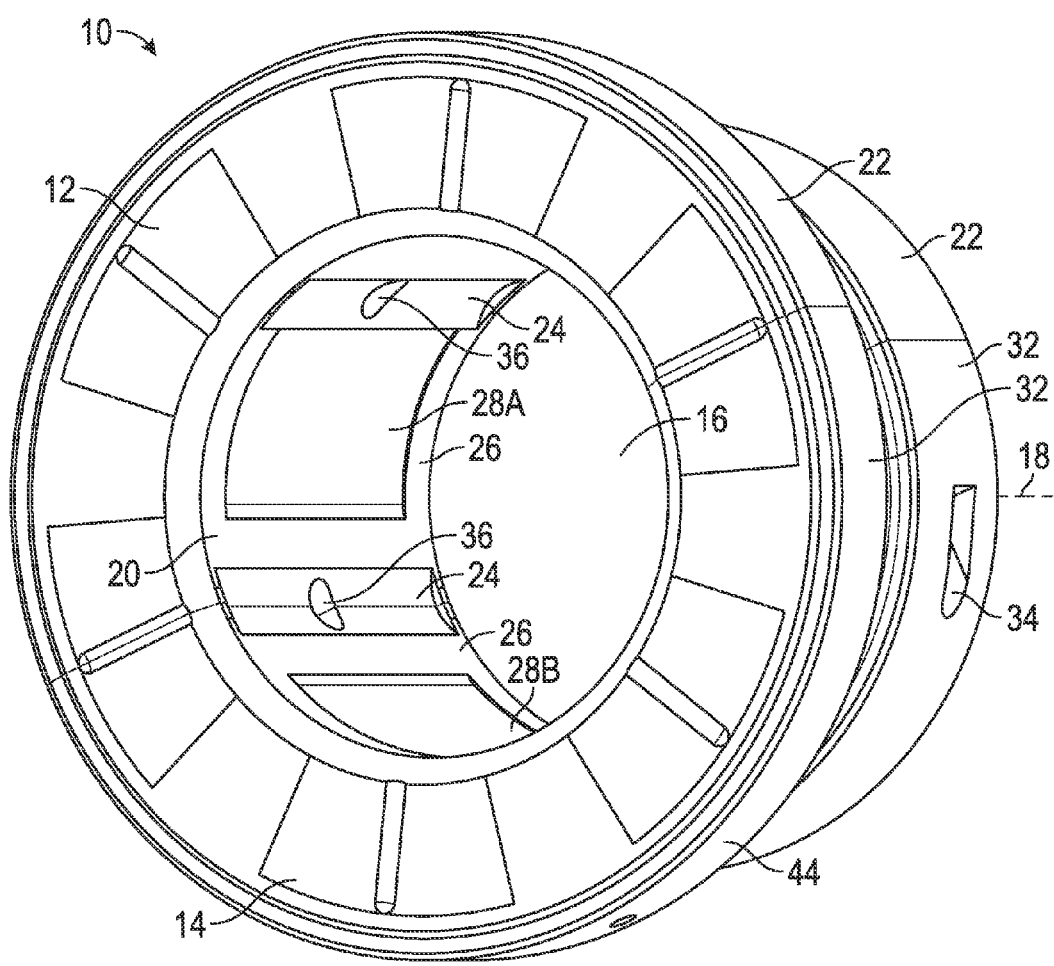
FIG. 5 illustrates another of many possible embodiments of journal bearing assembly with thrust faces utilizing the present inventions.
Figure 6:
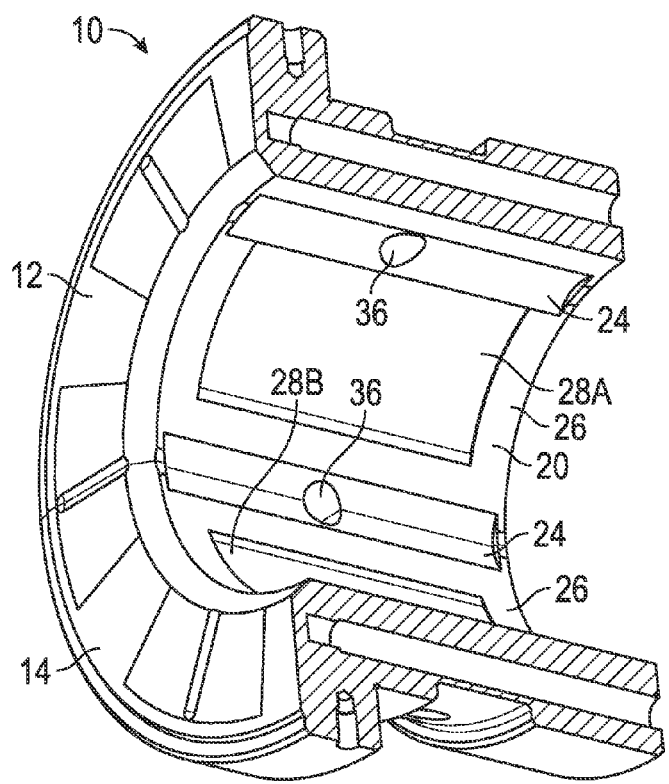
FIG. 6 illustrates another perspective view of a segment of the embodiment illustrated in FIG. 5.
Figure 7:
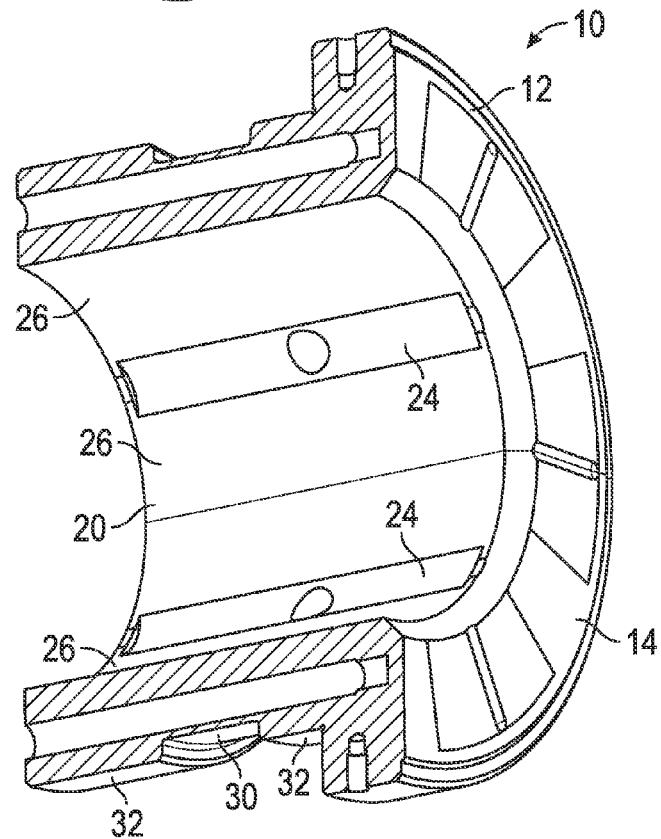
FIG. 7 illustrates another perspective view of a segment of the embodiment illustrated in FIG. 5.
Figure 8:
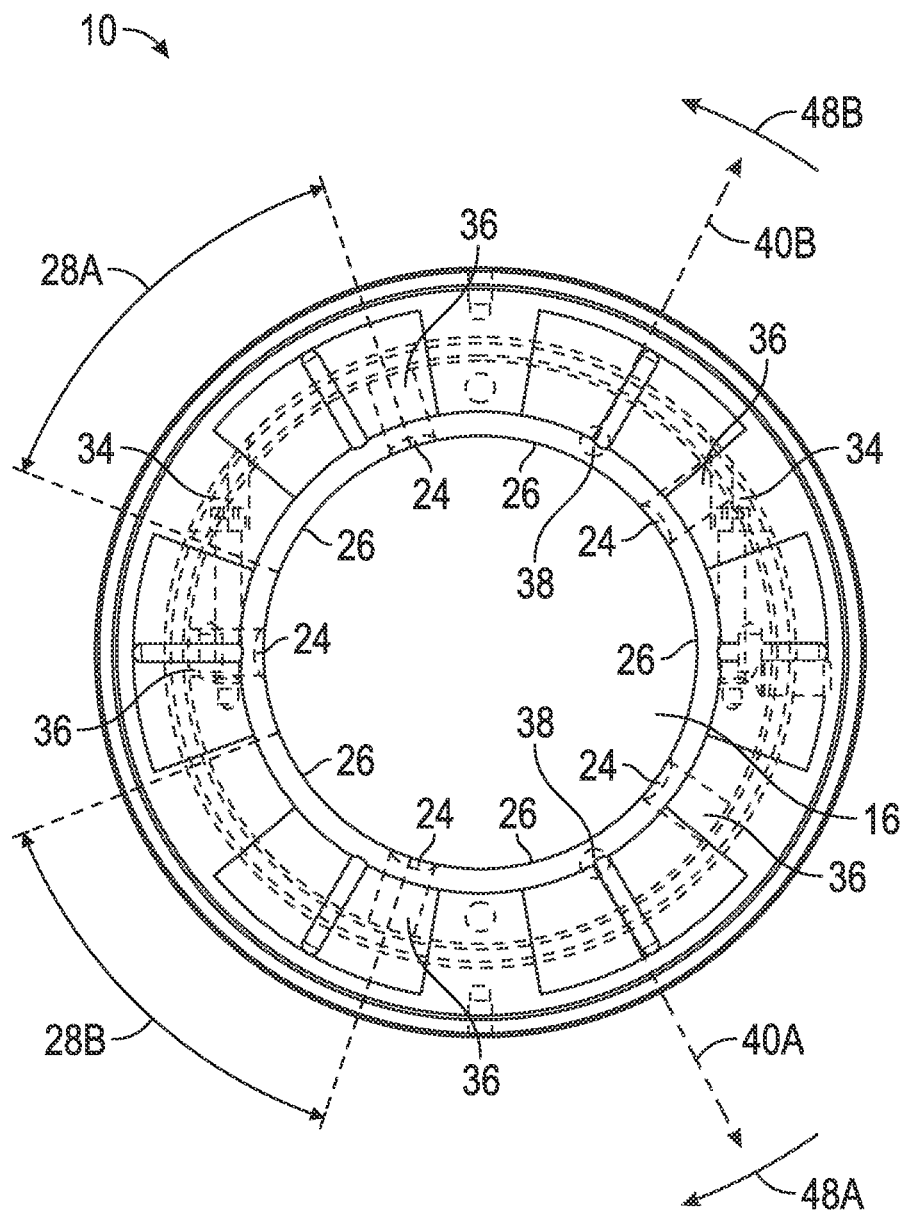
FIG. 8 illustrates a sectional view of the embodiment illustrated in FIG. 5.

Turning now to the figures, in FIGS. 1-8, a journal bearing assembly 10 may be provided with two halves 12, 14 defining a central opening 16, which typically receives a shaft (not shown) extending along an axis 18. In an exemplary and non-limiting illustrative embodiment, journal bearing assembly 10 is a fixed geometry journal bearing that behaves identically in bi-directional gearbox operation while maintaining dynamic stability. FIGS. 1-4 depict a journal bearing assembly 10 without thrust faces, while FIGS. 5-8 depict a journal bearing assembly 10 with a thrust face 44.

Journal bearing assembly 10 includes an inner surface 20 and an outer surface 22. Inner surface 20 of the journal bearing assembly 10 is typically covered (babbitted) with a thin layer of soft material, such as a lead or tin based babbitt to prevent the rotatable shaft from damages incurred by the bearing shell if metal to metal contact occurs. Typically, the overall thickness of the layers does not exceed 2.54 mm (0.10 inches). In an exemplary and non-limiting illustrative embodiment, the Babbitt is 0.762 mm (0.030 inches) thick. The journal bearing assembly 10 is provided with an outer central circumferential channel 30 defined between two raised annular ribs 32, provided with a plurality of fastening elements 34, which attach two halves 12, 14.

In an exemplary and non-limiting illustrative embodiment, five axial grooves or pockets 24, however, more than or fewer than five grooves can be employed as well, are machined on the inner surface 20 to create fixed bearing pads 26 between the axial grooves 24. In an exemplary and non-limiting illustrative embodiment, the axial grooves 24 are substantially symmetrically positioned on the inner surface 20, however, other positions can be employed as well. The substantially symmetrical positioning of the axial grooves 24 can create a more stable journal bearing assembly 10 for some applications. In FIGS. 1-8, axial grooves 24 are rectangular reliefs of non-uniform depth machined in the inner surface 20, however, other shapes, sizes, depths, or dimensions can be employed as well.

In an exemplary and non-limiting illustrative embodiment, two pressure dams, pockets, grooves, or steps 28A, 28B are machined in the inner surface 20 substantially opposite the symmetric load points 38 (shown in FIGS. 4 and 8) and are mirror images of each other from the centerline between the two dams 28A, 28B. However, more than or fewer than two dams, different locations, or different orientations can be employed as well. The pressure dams 28A, 28B are machined substantially opposite the symmetric load points 38 (shown in FIGS. 4 and 8) to tend to act in line with the vector loads 40A, 40B (shown in FIGS. 4 and 8) to stabilize the shaft (not shown) in the bearing oil film (not shown). Vector loads 40A, 40B show known or common bi-directional gearbox loads. The gearbox rotation direction 48A, 48B dictates vector loads 40A, 40B. Because the rotation may only occur in one direction at a time, only one of the two gearbox rotation directions 48A, 48B and only one of the corresponding vector loads 40A, 40B may occur at a time. When positioned opposite the vector loads 40A, 40B, the pressure dams 28A, 28B tend to augment the vector load and stabilize the shaft (not shown). Both the axial grooves 24 and pressure dams 28A, 28B are positioned to stabilize the journal bearing assembly 10 bearing in either load or direction. The symmetric load points 38 are not physical characteristics of or on the journal bearing assembly 10 but instead an indication of the direction of the vector loads 40A, 40B.

In FIGS. 1-8, the pressure dams 28A, 28B are shallow circumferential rectangular reliefs of uniform depth machined in the inner surface 20, however, other shapes, sizes, depths, or dimensions can be employed as well. Due to their mirrored orientations, the pressure dams 28A, 28B illustrated in FIGS. 1-8, are activated by only one shaft rotational direction when opposite the load vector. They are inactive otherwise when unloaded. The pressure dams 28A, 28B can create an oil dam. The circumferential velocity head of the oil suddenly being impeded by the dam may be converted to pressure head. The pressure differential before and after the pressure dams 28A, 28B can create a new loading that tends to force the journal bearing assembly 10 in the opposite direction of the pressure dams 28A, 28B. This pressure head tends to impose a load on the shaft (no shown) that tends to increase the eccentricity and may stabilize the journal bearing assembly 10.

Journal bearing assembly 10 may allow cool inlet oil to flow through the axial grooves 24 without interfering with a lubricating process of the inner surfaces 20 rotatably supporting a shaft (not shown) extending along an axis 18.

The Journal bearing assembly 10 may include a plurality of upstream cool oil inlets 36 provided for example on outer central circumferential channel 30 towards the axial grooves 24. Lubricating oil may be introduced under pressure in an oil conduit (not shown) inwardly from the outer central circumferential channel 30 and guiding the lubricating oil into axial grooves 24 of journal bearing 10. The oil is fed to the axial grooves 24. The shaft (not shown) then builds and rides on a film of lubricating oil, which, as the shaft rotates, is dragged along the inner surface 20 of journal bearing 10. Oil can discharge from the edges of inner surface 20 and also through small weeps machined through the axial grooves 24.

Journal bearing assembly 10 is manufactured from a material with a very high thermal conductivity of approximately 323.43093745 Watts/Meter-K (187 btu/(ft-hr-° F.)). Preferably, C18200 Chrome Copper or Ampcoloy™ is used for manufacturing the shell because this material is capable of conducting heat away from the inner surface 20 much more efficiently than for example babbitted 1018 carbon steel or babbitted C93200 bearing bronze. In fact, heat conductivity of Ampcoloy™ is more efficient by a factor of 5.5 as compared to bronze and by factor 6.4 as compared to steel. Copper alloy coefficient of thermal conductivity is in a range between 60 and 240. Therefore, the use of this material substantially lowers the bearing's maximum temperature, which, in turn, allows the bearing to operate at a higher speed, greater load and/or with less lubricating oil flow.

The examples disclosed herein are included to demonstrate preferred embodiments of the inventions. It should be appreciated by those of skill in the art that the techniques disclosed in the examples represent techniques discovered by the inventors to function well in the practice of the inventions, and thus can be considered to constitute preferred modes for its practice. However, those of skill in the art should, in light of the present disclosure, appreciate that many changes can be made in the specific embodiments which are disclosed and still obtain a like or similar result without departing from the scope of the inventions.

The inventions disclosed herein provide the benefit of symmetrical characteristics in either rotation direction to simplify rotating system dynamics evaluation. The inventions disclosed herein provide the benefit of hydrodynamic stability of the shaft in the oil film. Finally, the inventions disclosed herein provide the benefit of having a relatively small outer diameter and overall length. Elliptical and multi-lobe bearings that are classically applied to solve the problem addressed by the invention disclosed herein are not satisfactory for all applications. Many other stable fixed geometry designs do not satisfy symmetric loading needs for dual directions or are for single rotation only.

Due to one or more of the inventions disclosed herein having a compact, split (two-piece) assembly, hydrodynamic stability and symmetric operating behavior are accomplished. This has advantages in low cost of manufacture and for a problem that requires a small bearing envelope.

The inventions disclosed herein have been described as made of Ampcoloy™. However, the scope of the present invention also includes an assembly wherein the pads contain layers of different materials. Thus, for example, one or more components or layers thereof may be made of stainless carbon steel, or copper.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A cylindrical hydrodynamic journal bearing assembly, comprising:
    an inner surface;
    a first pressure dam and a second pressure dam machined into the inner surface,
        wherein the first pressure dam and the second pressure dam are substantially mirror images of each other along a centerline between the first pressure dam and the second pressure dam; and
    a plurality of axial grooves machined in the inner surface to form a plurality of fixed bearing pads,
        wherein the axial grooves are substantially circumferentially and symmetrically positioned on the inner surface; and
    wherein the first pressure dam, the second pressure dam and the plurality of axial grooves are positioned to permit bi-directional gearbox rotation.

2. The bearing assembly of claim 1, wherein
    the first pressure dam is located substantially opposite the direction of a first vector load of the journal bearing assembly; and
    the second pressure dam is located substantially opposite the direction of a second vector load of the journal bearing assembly.

3. The bearing assembly of claim 1, wherein the first pressure dam and the second pressure dam are circumferential rectangular reliefs of uniform depth.

4. The bearing assembly of claim 1, wherein plurality of axial grooves are rectangular reliefs of non-uniform depth.

5. The bearing assembly of claim 1, wherein the plurality of axial grooves comprises a first axial groove, a second axial groove, a third axial groove, a fourth axial groove and a fifth axial groove.

6. The bearing assembly of claim 1, wherein the plurality of fixed bearing pads comprises a first fixed bearing pad, a second fixed bearing pad, a third fixed bearing pad, a fourth fixed bearing pad, and a fifth fixed bearing pad.

7. The bearing assembly of claim 1, wherein the journal bearing assembly comprises two halves.

8. The bearing assembly of claim 1, wherein the inner surface includes a babbitted surface.

9. A hydrodynamic journal bearing assembly, comprising:
    an inner surface;
    a first pressure dam and a second pressure dam machined into the inner surface,
        the first pressure dam is located substantially opposite the direction of a first vector load of the journal bearing assembly; and
        the second pressure dam is located substantially opposite the direction of a second vector load of the journal bearing assembly;
    and
    a plurality of axial grooves machined in the inner surface to form a plurality of fixed bearing pads,
        wherein the axial grooves are substantially circumferentially and symmetrically positioned on the inner surface;
    wherein the first pressure dam, the second pressure dam and the plurality of axial grooves are positioned to permit bi-directional gearbox rotation.

10. The bearing assembly of claim 9, wherein the first pressure dam and the second pressure dam are substantially mirror images of each other along a centerline between the first pressure dam and the second pressure dam.

11. The bearing assembly of claim 9, wherein the first pressure dam and the second pressure dam are circumferential rectangular reliefs of uniform depth.

12. The bearing assembly of claim 9, wherein plurality of axial grooves are rectangular reliefs of non-uniform depth.

13. The bearing assembly of claim 9, wherein the plurality of grooves comprises a first axial groove, a second axial groove, a third axial groove, a fourth axial groove and a fifth axial groove.

14. The bearing assembly of claim 9, wherein the plurality of fixed bearing pads comprises a first fixed bearing pad, a second fixed bearing pad, a third fixed bearing pad, a fourth fixed bearing pad, and a fifth fixed bearing pad.

15. The bearing assembly of claim 9, wherein the journal bearing assembly comprises two halves.

16. The bearing assembly of claim 9, wherein the inner surface includes a babbitted surface.

17. A method of manufacturing a hydrodynamic journal bearing assembly, wherein the journal bearing includes an inner surface, comprising:
    machining a first pressure dam and a second pressure dam on the inner surface,
        wherein the first pressure dam and the second pressure dam are substantially mirror images of each other along a centerline between the first pressure dam and the second pressure dam, and
        wherein the first pressure dam and the second pressure dam permit bi-directional gearbox rotation; and
    machining a plurality of axial grooves machined on the inner surface to form a plurality of fixed bearing pads,
        wherein the axial grooves are substantially circumferentially and symmetrically positioned on the inner surface; and
        wherein the axial grooves permit bi-directional gearbox rotation.

18. The method of claim 17, wherein
    the first pressure dam is located substantially opposite the direction of a first vector load of the journal bearing assembly; and
    the second pressure dam is located substantially opposite the direction of a second vector load of the journal bearing assembly.

19. The bearing assembly of claim 17, wherein the first pressure dam and the second pressure dam are circumferential rectangular reliefs of uniform depth.

20. The method of claim 17, wherein the journal bearing assembly comprises two halves.

* * * * *